United States Patent Office 3,455,853
Patented July 15, 1969

3,455,853
METHOD FOR PREPARING POLYSACCHARIDE GRAFT COPOLYMERS
Henri G. G. Dekking, Fullerton, Calif., assignor to Union Oil Company of California, Los Angeles, Calif., a corporation of California
No Drawing. Filed Mar. 9, 1964, Ser. No. 350,565
Int. Cl. C08b 15/00, 15/06
U.S. Cl. 260—17.4      9 Claims

ABSTRACT OF THE DISCLOSURE

The invention comprises graft copolymers of polysaccharides and synthetic polymers wherein an ion exchange site is the point of grafting between the polysaccharide and the synthetic polymer. These graft copolymers are prepared by ion exchanging a basic-nitrogen, cationic, organic azo compound with the polysaccharide to obtain the azo compound ionically bonded to carboxyl group of the polysaccharide. The resultant adduct of the polysaccharide and organic azo compound is then heated in the presence of an ethylenically unsaturated monomer under solution, bulk or emulsion polymerization conditions. The azo compound decomposes to yield free radicals which remain ionically bonded to the polysaccharide and which initiate polymerization of the monomer to propagate a polymer chain from the polysaccharide. In this manner a synthetic polymer can be grafted to a polysaccharide with a single, terminal point of attachment.

THE INVENTION

This invention relates to graft copolymers of polysaccharides such as cellulose or starch and synthetic polymers and to a method for their preparation.

Polysaccharides are highly abundant naturally occurring polymers and have been used extensively for various purposes; however, the use of these materials could be expanded by combining the polysaccharide with synthetic polymeric materials to improve its properties. To illustrate, starch could be used as molding powders and cellulose fibers and textiles could have improved stiffness, wrinkle resistance, water repellency, rot resistance, strength, or other properties.

I have now found that various synthetic vinyl polymers bearing a cationic radical can be readily grafted to polysaccharides, e.g., cellulose or starch by use of the cation exchange sites present in the naturally occurring polysaccharide or added thereto by suitable treatments such as high energy radiation, oxidation, etc. The graft copolymers of my invention thus comprises a synthetic vinyl polymer bearing a cationic radical which is attached, through an ionic bond, to a carboxylic acid radical of the polysaccharide. These copolymers can be prepared by reacting, under base exchange conditions, a cationic vinyl polymer with cellulose or starch.

In a preferred embodiment of my invention, however, I have discovered that synthetic polymers can be readily graft propagated from the cellulose or starch molecule by base exchanging a polymerization initiator onto the polysaccharide to obtain a cellulose-initiator adduct and thereafter initiating polymerization of a vinyl monomer with the polysaccharide-initiator adduct.

The base exchange reaction occurring between a polysaccharide such as cellulose and an organic addent is as follows:

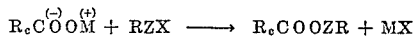

wherein
$R_c$ represents the polysaccharide, e.g., the cellulose structure;
M represents the cation associated with the carboxylic acid group on the cellulose;
R represents the cationic organic addent, i.e., the cationic synthetic polymer or cationic polymerization initiator to be base exchanged onto the cellulose fiber;
Z represents a suitable cationic radical; and
X represents the anion of the cationic polymer or cationic initiator.

The aforedescribed reaction is performed under base exchange conditions. Generally, such conditions are achieved by contacting the cellulose with an aqueous solution or suspension of the cationic addent at ambient temperature, e.g., 0° to 100° C., preferably 20° to 35° C.; due care being excerised to avoid temperatures that would decompose the reactants or cause other undesired reactions. The cationic addent can have any suitable anion associated therewith such as a halide, e.g. chloride, bromide, fluoride, iodode; sulfate; nitrate; hydroxide; phosphate; etc. Preferably, the particular anion will form a water soluble compound with the cation of the cellulose so that the graft copolymer can be freed of contaminates by water washing. Accordingly, I prefer to use the halide and hydroxide anions; most preferably, the chloride.

Cellulose from various materials can be treated in accordance with my invention and such materials include spinning, netting and cordage fibers prepared from various materials such as cotton, flax, ramie, hemp, pineapple, jute, sunn, sisal, coir, seaweed, palmeto, palmyra, kittul, broomroot, broomcorn, monkey bass, as well as various cellulosic filling materials such as cotton, lint, kapok, straw, grasses, moss, okum, excelsior; and various papers such as textile papers, palm papers, bamboo and grass papers, wood pulp cellulose papers, including ground wood, and the sulfide, soda and sulfate pulps. Also, cellulose that has been chemically modified by a prior chemical treatment can be used.

Various treatments can be used to increase the number of carboxylic acid groups on the cellulose, e.g., irradiation of cellulose with high energy ionizing radiation such as beta and gamma particles from radioactive isotopes such and $Ca^{45}$, $Ce^{144}$, $Ca^{137}$, $Sr^{89}$, $Co^{60}$, $Sc^{46}$, $Y^{90}$, etc. An electron beam generator can also be used such as is available from the General Electric Company in 1, 2 and 3.5 million volt sizes with beam-out currents of 6 to 8 milliamperes. Treatment of cellulose with irradiation dosages from 1 to about 1000 megarads; preferably from 25 to about 200 megarads generally increase its base exchange capacity to between about 2 and 25 milliequivalents per 100 grams.

Another convenient method to increase the base exchange capacity of cellulose and thereby increase the number of grafting sites is carboxylakylation by reacting cellulose with a haloalkyl carboxylic acid or its alkali metal salt at a temperature between about 20 and 125° C. In this method various carboxyalkylcellulose compounds can be prepared. Typical of such preparations are carboxymethyl cellulose by reaction of cellulose with sodium chloroacetate, carboxypropyl cellulose by reaction of cellulose with sodium chloropropionic acid, carboxybutyl cellulose by reaction of cellulose with sodium chlorobutyric acid and carboxyvaleryl cellulose by reaction of cellulose with sodium chlorovalerate. Preferably, the amount of the sodium chloroalkylate should be limited so that the degree of carboxyalkylation generally is less than 0.4 substituent per glucose unit of the cellulose since greater amounts impart an undesired water solubility to the cellulose, thereby complicating the base exchange reaction with the organic addent. Generally the amount of carboxyalkyl group so added should be sufficient to increase the base exchange capacity of cellulose to between 20 and 400 milliequivalents per 100 grams. Preferably, the capacity is increased to between about 50 and 250 milliequivalents per 100 grams.

Other chemical modifications of cellulose include phosphorylation comprising impregnating cellulose with aqueous phosphoric acid that optionally can contain urea and then heating the impregnated cellulose to about 100° to 150° C. so as to add from 0.05 to about 0.3 phosphoric acid group per glucose unit. The resultant phosphorylated cellulose has a base exchange capacity between about 25 and 250 milliequivalents per 100 grams.

The base exchange properties of the various cellulose materials vary considerably depending upon the nature and source of the cellulose and its purity. In some naturally occurring cellulose a high base exchange property is encountered, principally from various materials associated with cellulose such as lignin and peptic substances. A lower base exchange capacity is observed in celluloses freed from such impurities and cellulose compounds occurring naturally free from such peptic substances; this base exchange capacity is caused by the acidic groups on the cellulose itself. In general, the base exchange capacity of cellulosic materials can vary from about 0.3 to about 20 milliequivalents per 100 grams. Cellulose derived from cotton generally has base exchange capacities from about 0.1 to about 2 milliequivalents per 100 grams and cellulose papers, e.g., hemp paper, have from about 5 to about 15 milliequivalents per 100 grams.

Starches are also polysaccharides and can be used as the backbone polymer in my invention. In general, starches are polymers of glucopyranose units joined by α-glucosidic linkages. Linear polymers, amylose, and branched polymers, amylopectin, occur. The starches can be from any available source, starches from corn, tapioca, arrowroot, potato, sago palm stems, etc., are examples of commercially available starches.

Various cationic radicals can be employed to serve as the link between the polysaccharide and the synthetic polymer. In general, any onium compound of the type $RZH_y$ can be used; these are isologs of ammonium and contain the element Z in its highest positive valency. Z can be pentavalent as in ammonium, phosphonium, arsonium, stibonium; Z can be tetravalent as in oxonium, sulfonium, selenonium and stannonium; and Z can be trivalent as in idonium. Of the aforementioned, the quaternary, amidinium and ammonium salts of basic nitrogen groups are, of course, the most common. Cationic organic addents that can be readily obtained for base exchange onto the cellulose comprises ammonium or amidinium terminated polymers.

The ammonium terminated polymers are derived from amine terminated polymers which, in turn, can be obtained by any of several methods. In one method, available for a limited number of polymeric materials, amine terminated polymers can be obtained by anionic chain homo- or copolymerization of vinyl monomers. This polymerization is initiated by an amide ion that becomes an integral part of the polymer. The polymerization is performed in liquid ammonia and is initiated by the addition of an alkali metal amide to the reaction medium or by the addition of an alkali metal such as sodium, potassium, cesium, etc., with a suitable catalyst to form the amide ion in situ. Any of the following monomers can be polymerized or copolymerized in this manner to produce amine terminated polymer and copolymer chains: styrene, acrylonitrile and methacrylonitrile. Various copolymers such as styrene-acrylonitrile copolymer, styrene-methacrylonitrile copolymer, acrylonitrile - methacrylonitrile copolymer, etc. can also be obtained in this manner. The polymerization is performed in ammonia at atmospheric or superatmospheric pressure so as to maintain the ammonia in a liquid phase. Generally between about 1 and 200 atmospheres are employed and the polymerization is performed at temperatures between about —75° and about 120° C., lower temperatures tending to favor the highest molecular weight polymers. The resultant polymers contain the initiating amide ion at the end of the polymer chain and this amide ion can be readily converted to an ammonium salt for base exchange with the cellulose material in the manner hereafter described.

Synthetic polymers terminated with a basic nitrogen such as an amine or amidine group can also be obtained from the polymerization of a variety of vinyl monomers with azo initiators having the following structure:

$$R_1-N=N-R_2$$

wherein at least one and preferably both $R_1$ and $R_2$ contain a cationic group, preferably a basic nitrogen group; and $R_1$ and $R_2$ are selected from the class consisting of aryl, alkaryl, aminoaryl, amidinylaryl, aminoalkaryl, alkyl, amidinylalkaryl, amidinylalkyl, aminoalkyl, aralkyl, amidinylaralkyl and aminoaralkyl.

Preferably, the cationic azo compounds have secondary or tertiary carbons vicinal to the azo nitrogen. Representative of this class of bifunctional azo compounds are the following:

Where $R_1$ is aryl or alkaryl and $R_2$ is aminoaryl, amiamidinylalkyl, aminoaralkyl or amidinylaralkyl: phenylazomethylamine, phenylazopropylamine, 2 - naphthylazomethylamine, p-tolylazobutyramidine, p-tolylazoisopropylamidine, p - tolylazopentylamidine, α - (phenylazo)-β-aminocumene, α-(tolylazo)-β-aminocumene, α - (phenylazo)-p-aminotoluene, etc.

Where $R_1$ is aryl or alkaryl and $R_2$ is aminoaryl, amidinylaryl, aminoalkaryl, or amidinylalkaryl: 4-aminoazobenzene, 3-aminoazobenzene, N,N'-dimethyl-4-aminoazobenzene, 1-amino-2,2'-azonaphthalene, etc.

Where $R_1$ is alkyl or aralkyl and $R_2$ is aminoalkyl, amidinylalkyl, aminoaralkyl or amidinylaralkyl: aminodiazomethane, methylazobutyramidine, 2 - methylazoisopropylamine, α-ethylazo-β-aminocumene, α - methylazophenethylamine, etc.

Where $R_1$ is alkyl or aralkyl and $R_2$ is aminoaryl, amidinylaryl, aminoalkaryl) or amidinylalkaryl: p-aminophenylazomethane, o-aminoxylazoisopropane, 6-amino-2-naphthylazoethane, 2-(p - aminophenyl)-1-phenylethane, etc.

Where $R_1$ and $R_2$ contain amino or amidinyl groups: 4,4'-diaminoazobenzene, 3,3'-dimethyl - 4,4'-diaminoazobenzene, 6-(p-aminophenylazo)-2 - naphthylamine, 2,2'-azobisisobutyramidine, α,α' - azobis(p - quanyltoluene), azobisisopropylamine, azobismethylamidine, etc.

In another embodiment, $R_1$ and $R_2$ can be a single alkylene group, thereby forming a heterocyclic azo compound. The heterocyclic initiators are represented by the following:

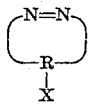

wherein:

R is selected from the class consisting of alkylene, alkylalkylene, arylalkylene;

X is a basic nitrogen group; and the total carbons in said compound is between about 2 and 20. Preferably, these heterocyclic azo compounds have secondary or tertiary carbons vicinal to the azo nitrogen.

Representative of the aforementioned azo compounds are:

3,5-diamidinyl-1,2-diazo-1-cyclopentene,
3-methyl-3,4-diamidinyl-1,2-diaza-1-cyclopentene,
3-ethyl-3,5-diamidinyl-1,2-diaza-1-cyclopentene,
3,5-dimethyl-3,5-diamidinyl-1,2-diaza-1-cyclopentene,
3,6-diamidinyl-1,2-diaza-1-cyclohexene,
3-propyl-3,6-diamidinyl-1,2-diaza-1-cyclohexene,
3-isopropyl-3,6-diamidinyl-1,2-diaza-1-cyclohexene,
3-amyl-6-methyl-3,6-diamidinyl-1,2-diaza-1-cyclohexene,
3-phenyl-3,5-diamidinyl-1,2-diaza-1-cyclopentene,
3,5-diphenyl-3,5-diamidinyl-1,2-diaza-1-cyclopentene, 3-methyl-5-phenyl-3,5-diamidinyl-1,2-diaza-1-cyclo-
pentene,
3-phenyl-3,6-diamidinyl-1,2-diaza-1-cyclohexene,
3,6-diphenyl-3,6-diamidinyl-1,2-diaza-1-cyclohexene,
3-(p-amino-phenyl)-1,2-diaza-1-cyclopentene,
3,5-di(aminomethyl)-1,2-diaza-1-cyclopentene,
3-aminoisopropyl-1,2-diaza-1-cyclohexene,
3-ethyl-6-(o-aminophenyl)-1,2-diaza-1-cyclohexene,
3,8-diamidinyl-1,2-diaza-1-cyclooctene,
5-(p-aminophenyl)-1,2-diaza-1-cyclodecene, etc.

The aforementioned cyclic azo compounds can be readily obtained from the corresponding diketone compound by reacting, in a first step, the diketone with hydrogen cyanide and hydrazine at temperatures between about 0° and 100° C. and pressures sufficient to maintain liquid phase conditions. The ensuing reaction forms a heterocyclic hydrazine which can thereafter be oxidized with bromine to yield the heterocyclic compound containing the azo linkage that bridges the original ketocarbons to form the ring and which also contains an appendant nitrile group from each of the former ketocarbons of the parent compound. The dinitrileazocyclo compound can thereafter be converted to an amidinyl compound by treating with an alcoholic solution of a halogen acid, e.g., hydrogen chloride in ethanol at from about 0° to 15° C. and thereafter contacting with ammonia at a temperature between about 5° and 20° C. to convert the nitrile groups to amidinyl groups.

Any of the vinyl compounds that are readily polymerized by initiation with a free radical can be polymerized by the aforementioned azo compounds. As employed herein, the term "vinyl polymer" means a substantially linear macromolecule derived by polymerization of at least one monoolefinic compound through aliphatic unsaturation. The term vinyl is thus inclusive of vinyl, vinylene and vinylidene radicals. In general, such vinyl monomers include the following:

Hydrocarbon olefins and diolefins such as ethylene, propylene, butene-1, isobutylene, butadiene, pentene-1, isopentene, pentadiene, isoprene, hexene, isohexene, isoheptene, heptadiene, octene, isooctene, nonene, decene, styrene, methylstyrene, vinyl naphthalene, etc.;

Vinyl halides such as vinyl fluoride, vinyl chloride, vinylidene chloride, fluorotrichloroethylene, chlorostyrene, chloroprene, etc.;

Acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, isopropyl methacrylate, isobutyl acrylate, amyl methacrylate, hexyl methacrylate, lauryl methacrylate, stearyl methacrylate, etc.;

Vinyl ethers such as ethyl vinyl ether, isopropyl vinyl ether, butyl vinyl ether, etc.;

Vinyl esters such as vinyl acetate, vinyl propionate, vinyl isobutyrate, vinyl benzoate, diallyl phthalate, divinyl terephthalate, vinyl naphthoate, etc.; and Miscellaneous vinyl compounds such as vinyl pyridine, vinyl carbazole, vinyl pyrrolidone, etc.

Any of the aforementioned monomers or mixtures thereof can be polymerized or copolymerized with the free radicals prepared in accordance with my invention using otherwise conventional techniques in the art. Thus, emulsion, bulk or solution polymerization can be employed.

As previously mentioned, the preferred embodiment of my invention comprises base exchanging a suitable polymerization initiator onto the polysaccharide and thereafter employing the polysaccharide-initiator complex to initiate polymerization of a suitable vinyl monomer and thereby graft propagate a polymer chain from the polysaccharide. In this embodiment, any of the aforementioned polymerization initiators having one or more cationic groups can be employed; however, I prefer the aforementioned cationic azo compounds.

In this embodiment of my invention, the heterocyclic azo initiators offer an advantage; their use reduces the amount of homopolymer formed since decomposition of the cyclic initiator merely opens the ring and provides a single fragment still bonded to the polysaccharide that has a free radical at each end. The decomposition of the aforementioned acyclic azo compounds divides the compound and yields two fragments bearing free radicals capable of initiating polymerization. With such acyclic azo compounds, even when both ends of the compound contain a cationic group, some homopolymer can nevertheless be formed during polymerization because statistically not every initiator will be bonded to the cellulose at both cationic groups.

In either embodiment, the organic addent, i.e., the cationic synthetic polymer or the cationic polymerization initiator are combined with the polysaccharide by any suitable base exchange method. The synthetic organic addent, be it the cationic polymerization initiator or the cationic polymer, can be readily prepared from an organic compound having basic nitrogen group to a cationic compound by various methods apparent to those skilled in the art. The organic basic nitrogen compound can be dissolved in a suitable inert solvent such as benzene, chloroform, methylethyl ketone, dichlorobenzene, formamide, dimethyl formamide, acetone, hexane, trichloroethane, cyclohexane, isopropylacetate, ethyl propionate, toluene, amyl bromide, xylene, n-butyl ether, etc., and a dilute acid thereafter added to form the cationic group, e.g., the ammonium or amidinium salt of the organic addent. Suitable acids are hydrochloric, acetic, phosphoric, sulfuric, nitric, etc. If desired, a positively charged quaternary group can be formed by the addition of organic esters of mineral acids such as methyl sulfate, triethyl phosphate, ethyl nitrate, etc. or by the addition of alkyl halides such as methyl chloride, ethyl fluoride, etc.

By any of these methods, the basic nitrogen of the organic compound is converted to its highest possible valency which, upon addition of water, gives rise to an organic cation. This is suitably accomplished by the addition of about 0.1 to 10 parts of water to each part of the organic solution. The solvent-water dispersion of organic cations is thereafter added to a dispersion of the polysaccharide, whereupon the polysaccharide-graft copolymer or the polysaccharide-initiator complex is formed by conventional base exchange of the organic cation for the cation present on the polysaccharide. If desired, it is of course apparent that the several steps described above can be simultaneously performed by the addition of the dilute acid, water and polysaccharide suspension to the organic solution of the organic addent or simply by the addition of the organic addent to an acidified aqueous suspension of the polysaccharide.

The polysaccharide adduct, e.g., cellulose-graft copolymer or cellulose-initiator complex is a very stable product. The ionic bonding of the organic cation to the polysaccharide is very stable because the cation is very large, e.g., a polystyrene macromolecule. Consequently, the adducts are stable and resistant to organic solvents and aqueous solutions.

When the organic addent employed in the base exchange step is the cationic terminated synthetic polymer, the polysaccharide graft copolymer can be separated from the aqueous suspension used in its preparation by any suitable solid-liquid separation technique, and dried. When the organic addent comprises the cationic polymerization initiator as in the preferred embodiment of my invention, the polysaccharide graft copolymer can be derived therefrom by adding the vinyl monomer to the suspension and heating the resultant suspension to the suitable activation temperature, e.g., between about 35° and 150° C., to initiate the polymerization. If desired, however, the polysaccharide-polymerization initiator complex can be separated from the aqueous solution employed in its preparation and the resultant solid product can be stored, handled and subsequently employed in a polymerization to obtain the desired products.

The polysaccharide-initiator complex prepared in accordance with my invention can thereafter be employed for the initiation of polymerization of various vinyl monomers. As previously mentioned, emulsion, bulk or solution polymerization can be employed. The initiators are well suited to bulk homo- or copolymerization by the dispersion of between about 0.05 and about 10,000 parts by weight of the polysaccharide initiator complex in 100 parts by weight of the monomer; preferably between about 20 and about 2000 parts by weight per 100 parts of any of the aforementioned monomers is employed. The resultant dispersion is thereafter heated, preferably under nitrogen, to between about 25° and 125° C. to decompose the azo radical and initiate polymerization. This technique is well suited for the use of various polysaccharide fillers, e.g., starch, sawdust, wood pulp, etc. in molding compositions.

Emulsion homo- or copolymerization of the aforementioned monomers can also be performed with use of my polysaccharide-initiator complex. Examples of various monomers that can very readily be emulsion polymerized are butadiene, styrene, butadiene-styrene, vinyl acetate, vinyl chloride and acrylic acid esters such as methylmethacrylate, ethylacrylate, lauryl methacrylate, acrylonitrile, etc. In general, the emulsion is formed by the addition to the reactants of about 0.1 to about 5.0 percent (based on the amount of the monomer) of a nonionic emulsifying agent, e.g., condensates of ethylene oxide with alkylphenols, fatty acids, fatty alcohols, and fatty amides which preferably have hydrophobic groups containing between about 10 and about 24 carbons and between about 10 and 15 ethylene oxide units. Emulsions containing from 5 to about 300 parts by weight of the monomer in 100 parts water can be used, preferably, the monomer is used in an amount between about 10 and about 200 parts per 100 parts of water. The polysaccharide-initiator complex is used in amounts between about 0.05 and about 10,000 parts per 100 parts of monomer; preferably in amounts between about 0.2 and about 200 parts per 100 parts water.

Solution polymerization of the aforementioned monomers or copolymerization of mixtures of the monomers can also be conducted in various solvents such as benzene, cyclohexane, n-hexane, ethylbenzene, trichlorobenzene, dimethyl formamide, pentane, heptane, acetone, methanol, etc. The monomer or mixture of monomers is added to the solvent, generally in an amount between about 5 and about 300 parts per 100 parts of solvent, preferably between about 10 and about 200 parts per 100 parts. The polysaccharide-initiator complex of my invention can readily be dispersed in any of the aforementioned solvents in the necessary amounts; between about 0.05 and about 500 parts per 100 parts of monomer, preferably between about 0.2 and about 200 parts per 100 parts of monomer are employed. Upon heating to the selected initiation temperature; between about 25° and about 80° C.; the azo nitrogen-carbon bonds of the polysaccharide-initiator complex of my invention are homolytically cleaved and free radicals are generated which react with the monomer to initiate polymerization. In any of the aforedescribed polymerization techniques, polysaccharide graft copolymers are obtained wherein the synthetic polymeric material is grafted to the polysaccharide through a cationic group linkage, preferably through a basic nitrogen radical.

The following examples will illustrate my invention and demonstrate the results obtainable therewith:

Example 1

A variety of cellulose materials were treated in accordance with the following procedure. The cellulose material was soaked in dilute, 10 weight percent, aqueous hydrochloric acid for 1 hour and then washed in distilled water. The washed material was then immersed in a dilute aqueous solution of a cationic azo compound, 2,2'-azobisisobutyramidine hydrochloride. The cellulose was removed from the solution of the initiator, washed and thereafter used to initiate polymerization of various vinyl monomers. To perform the polymerization, the monomers were dissolved in a suitable solvent or dispersed in water at a concentration of between about 1 and about 50 weight percent and into this solution was introduced the cellulose-initiator. Thereupon, the polymerization medium was heated to 60° C. and held at this temperature for several hours to insure complete polymerization. The polymerization medium was thereafter filtered and the solids so recovered were washed, dried and then extracted with a solvent for the polymer so as to remove homopolymer from the cellulose graft copolymer.

The following table summarizes the experiments:

TABLE 1

| Test No. | Cellulose | Synthetic graft polymer | Wt. percent of the synthetic polymer in the graft copolymer |
|---|---|---|---|
| 1 | Cotton balls | Polystyrene | 11 |
| 2 | Soxleth thimbles | do | 11.6 |
| 3 | Cotton balls | do | 29 |
| 4 | do | Polyvinyl acetate | 24.5 |
| 5 | do | Polyacrylamide | 13 |
| 6 | Cotton pillowcase | Polystyrene | 20 |
| 7 | Cotton balls | Polyacrylonitrile | 16 |
| 8 | Cellulose acetate | Polymethyl methacrylate | 14 |
| 9 | Filter paper | do | 55 |
| 10 | Sawdust | do | 70 |
| 11 | Cellulose triacetate | Polyacrylonitrile | 4 |
| 12 | Rayon | do | 33 |

The preceding examples clearly demonstrate that the graft copolymer was formed. The copolymers wherein polystyrene was the synthetic polymer employed were extracted by immersion in benzene while refluxing at atmospheric pressure; the polyvinyl acetate sample was extracted with acetone at 25° C. for 24 to 48 hours; the polyacrylamide sample was extracted with water at 25° C. for 72 hours; the polyacrylonitrile samples were extracted with dimethyl formamide at 25° C. for 24 to 48 hours; the polymethylmethacrylate samples were extracted with benzene at 25° C. for 24 to 48 hours. The tabulated results set forth the amount of unextractible synthetic polymer in the graft copolymer.

The cellulose graft copolymer with polystyrene in all cases were very water resistant, e.g., samples were floated on the surface of distilled water for several months. The polystyrene-pillowcase was highly water repellent.

The moisture adsorptivity of the various cellulose graft copolymers was determined and compared to the untreated cellulose by drying samples of test numbers 1, 3, 4, 5 and 7, and an untreated cellulose in a vacuum for 20 hours at 100° C. The samples were allowed to cool to room temperature and then weighed and placed in a closed container that was partly filled with water. The samples were weighed at periodic intervals until each sample reached a constant weight after about 144 hours. The results are listed below to show the relative moisture adsorptivity of the samples:

TABLE 2

| Sample No. | Description | Wt. percent moisture adsorbed |
|---|---|---|
| 1 | Polystyrene-cotton | 16.3 |
| 3 | do | 15.7 |
| 4 | Polyvinyl acetate-cotton | 24.5 |
| 5 | Polyacrylamide-cotton | 25.5 |
| 7 | Polyacrylonitrile-cotton | 13.5 |
| | Unmodified cotton | 19.2 |

To demonstrate the chemical inertness of the rayon-polyacrylonitrile graft copolymer, a small amount of the graft copolymer fibers were covered with 10 weight percent aqueous sodium hydroxide solution and held at 25° C. for ½ hour. Thereafter, the mixture was placed in a refrigerator at 5° C. for 16 hours. At the end of this period there was no swelling or change in physical appearance observed. When unmodified rayon is placed in the dilute sodium hydroxide solution, it is observed to swell greatly and discolor.

Example 2

To 375 milliliters of distilled water were added 102.6 grams (dry basis) of commercial corn starch and 1 gram of azobisisobutyramidine hydrogen chloride. The resultant dispersion was stirred, then purged with argon at room temperature. Thereafter 100 grams of methyl methacrylate was added with 1 milliliter of a nonionic emulsifier. The mixture was stirred and heated to about 60°–70° C. and maintained at this temperature for about two hours.

The product was recovered by filtration, dried and then extracted with ethylene dichloride at 50° C. The solvent insoluble solid was analyzed and found to comprise starch having 6 weight percent polymethylmethacrylate bonded thereto.

The preceding examples are intended only to illustrate a mode of practice of my invention and to demonstrate the results obtainable therewith. My invention is not intended to be unduly limited by such illustrations but is intended to be defined only by the components and their obvious equivalents set forth in the following composition claims and the steps and their obvious equivalents set forth in the following method claims.

I claim:

1. The method for graft propagating a polymer from a polysaccharide bearing carboxylic acid radicals which comprises reacting a basic nitrogen cationic organic azo compound having the structure $R_1$—N=N—$R_2$ wherein each of $R_1$ and $R_2$ contains a basic nitrogen cationic group with said polysaccharide under base exchange conditions so as to form an ionic bond between the carboxylic acid radicals of said polysaccharide and the cationic radicals of said cationic organic azo compound and thereby form a polysaccharide azo complex, mixing said polysaccharide azo complex with an ethylenically unsaturated monomer that undergoes free radical polymerization through aliphatic unsaturation, heating said polysaccharide azo complex to decompose the azo radical of said complex by homolytic fission thereby obtaining free radicals which are ionically bonded to said polysaccharide and which initiate polymerization of said monomer to graft propagate a substantially linear polymer from said polysaccharide.

2. The method of claim 1 wherein said polymerization is performed in an aqueous medium with an aqueous suspension of said monomer.

3. The method of claim 1 wherein said polymerization is performed in a solvent for said monomer.

4. The method of claim 1 wherein the crude graft copolymerizate from said polymerization is separated from the polymerization medium and washed with a solvent for said polymer so as to extract uncombined polymer therefrom and thereby purify said cellulose graft copolymer.

5. The method of claim 1 wherein said polysaccharide is cellulose.

6. The method of claim 1 wherein said polysaccharide is starch.

7. The method of claim 1 wherein said azo compound is 2,2'-azobisisobutyramidine.

8. The method of claim 1 wherein $R_1$ and $R_2$ are selected from the group consisting of aminoaryl, amidinylaryl, aminoalkaryl, amidinylalkaryl, amidinylalkyl, aminoalkyl, amidinylaralkyl and aminoaralkyl.

9. The method of claim 1 wherein said $R_1$ and $R_2$ are amidinylalkyl.

References Cited

UNITED STATES PATENTS

| 2,599,299 | 6/1952 | Upson | 260—192 |
| 3,083,118 | 3/1963 | Bridgeford. | |
| 3,108,890 | 10/1963 | Beaver | 204—160.1 |

OTHER REFERENCES

Bolt et al.: Radiation Effects on Organic Materials, New York, Academic Press, 1963 (January 23), pp. 432–434 and 444–445.

WILLIAM H. SHORT, Primary Examiner

M. GOLDSTEIN, Assistant Examiner

U.S. Cl. X.R.

8—116.2; 204—160.1; 260—17